(12) United States Patent
Chun et al.

(10) Patent No.: US 11,189,168 B2
(45) Date of Patent: Nov. 30, 2021

(54) APPARATUS AND SERVER FOR SHARING POSITION INFORMATION OF VEHICLE

(71) Applicants: HYUNDAI MOTOR COMPANY, Seoul (KR); KIA MOTORS CORPORATION, Seoul (KR)

(72) Inventors: Chang Woo Chun, Anyang-si (KR); Dong Jin Kim, Suwon-si (KR); Kyo Woong Choo, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 6 days.

(21) Appl. No.: 16/506,591

(22) Filed: Jul. 9, 2019

(65) Prior Publication Data
US 2020/0175867 A1   Jun. 4, 2020

(30) Foreign Application Priority Data
Dec. 3, 2018   (KR) .......................... 10-2018-0153854

(51) Int. Cl.
| | |
|---|---|
| *G08G 1/127* | (2006.01) |
| *H04L 29/06* | (2006.01) |
| *H04W 4/029* | (2018.01) |
| *H04W 4/44* | (2018.01) |

(52) U.S. Cl.
CPC ......... *G08G 1/127* (2013.01); *H04L 63/0876* (2013.01); *H04W 4/029* (2018.02); *H04W 4/44* (2018.02)

(58) Field of Classification Search
CPC ........ G08G 1/127; H04W 4/44; H04W 4/029; H04L 63/0876
See application file for complete search history.

(56) References Cited

U.S. PATENT DOCUMENTS

| | | | |
|---|---|---|---|
| 7,496,948 B1 * | 2/2009 | Hamilton, II ........... | F16P 3/147 726/1 |
| 10,015,654 B2 * | 7/2018 | Ossin .................... | B60R 25/102 |
| 10,200,364 B1 | 2/2019 | Ketharaju et al. | |

(Continued)

OTHER PUBLICATIONS

Office Action issued in corresponding U.S. Appl. No. 16/207,511 dated Mar. 29, 2021.

(Continued)

*Primary Examiner* — Nay Tun
(74) *Attorney, Agent, or Firm* — Morgan, Lewis & Bockius LLP

(57) ABSTRACT

A position information sharing apparatus of a vehicle includes a communication circuit communicating with a server and a processor electrically connected to the communication circuit. The processor is configured to receive authentication information for sharing of position information of the vehicle from the server, using the communication circuit, to transmit the authentication information to an external device, using the communication circuit such that the external device which is a sharing target of the authentication information is capable of obtaining the position information from the server, and to obtain information within a preset range corresponding to the apparatus among the position information at a preset timing corresponding to the apparatus, from the server using the authentication information.

20 Claims, 9 Drawing Sheets

(56) References Cited

U.S. PATENT DOCUMENTS

| | | | |
|---|---|---|---|
| 10,264,389 B1* | 4/2019 | Hwang | H04W 4/02 |
| 10,509,095 B1* | 12/2019 | Kim | G01S 5/0027 |
| 10,560,823 B1* | 2/2020 | Chen | G07C 5/008 |
| 10,672,060 B2* | 6/2020 | Ricci | B60L 53/65 |
| 10,726,652 B2* | 7/2020 | Jinnai | B60R 25/102 |
| 2002/0115436 A1* | 8/2002 | Howell | B60R 25/102 |
| | | | 455/426.1 |
| 2005/0120200 A1* | 6/2005 | Brignone | G06F 16/95 |
| | | | 713/154 |
| 2005/0288827 A1* | 12/2005 | Watkins | G01C 21/26 |
| | | | 701/1 |
| 2006/0122773 A1* | 6/2006 | Nou | B60R 25/33 |
| | | | 701/484 |
| 2006/0155461 A1* | 7/2006 | Cho | G01C 21/005 |
| | | | 701/408 |
| 2009/0119657 A1* | 5/2009 | Link, II | G06F 8/65 |
| | | | 717/171 |
| 2010/0211649 A1* | 8/2010 | Dimas | G06Q 10/107 |
| | | | 709/206 |
| 2011/0112969 A1* | 5/2011 | Zaid | G06Q 10/02 |
| | | | 705/50 |
| 2011/0234399 A1* | 9/2011 | Yan | H04W 4/70 |
| | | | 340/539.32 |
| 2012/0144452 A1 | 6/2012 | Dyor et al. | |
| 2013/0104035 A1* | 4/2013 | Wagner | G06F 16/29 |
| | | | 715/240 |
| 2013/0166073 A1* | 6/2013 | Pine | F24F 11/30 |
| | | | 700/276 |
| 2013/0249713 A1* | 9/2013 | Adelson | G08G 1/20 |
| | | | 340/989 |
| 2013/0274953 A1* | 10/2013 | Miljkovic | G07C 5/008 |
| | | | 701/1 |
| 2014/0026193 A1 | 1/2014 | Saxman et al. | |
| 2015/0127493 A1* | 5/2015 | Winkelman | G06Q 20/4012 |
| | | | 705/26.81 |
| 2015/0168168 A1 | 6/2015 | Kustanowitz | |
| 2015/0256973 A1* | 9/2015 | Raounak | H04L 67/22 |
| | | | 726/7 |
| 2017/0187707 A1* | 6/2017 | Miu | H04L 63/0861 |
| 2018/0262891 A1* | 9/2018 | Wu | H04W 4/00 |
| 2018/0357898 A1* | 12/2018 | Kamini | H04N 5/23293 |
| 2019/0132719 A1* | 5/2019 | Mizutani | B60L 53/60 |
| 2019/0156279 A1* | 5/2019 | Fujiwara | G06Q 10/0833 |
| 2019/0205797 A1* | 7/2019 | Sakurada | G07C 9/00571 |
| 2019/0208024 A1 | 7/2019 | Jablonski | |
| 2019/0295142 A1* | 9/2019 | Paulucci | G07B 15/02 |
| 2019/0299802 A1* | 10/2019 | Neubecker | B60L 53/665 |
| 2020/0084193 A1* | 3/2020 | Beaurepaire | H04W 4/024 |
| 2020/0126175 A1* | 4/2020 | Fong | G06Q 50/30 |
| 2020/0168088 A1* | 5/2020 | Goluguri | G08G 1/127 |

OTHER PUBLICATIONS

Final Office Action issued in corresponding U.S. Appl. No. 16/207,511 dated Jul. 9, 2021.

* cited by examiner

APPARATUS AND SERVER FOR SHARING POSITION INFORMATION OF VEHICLE

CROSS-REFERENCE TO RELATED APPLICATION

This application claims the benefit of priority to Korean Patent Application No. 10-2018-0153854, filed in the Korean Intellectual Property Office on Dec. 3, 2018, the entire contents of which are incorporated herein by reference.

TECHNICAL FIELD

The present disclosure relates to a system for sharing position information of a vehicle with various apparatuses.

BACKGROUND

With the development in the automobile industry, a system for providing various services using wireless communication technology has been continuously developed so as to provide convenience to a driver. For example, there is a service providing position information and state information of the vehicle. For providing the service described above, the vehicle shares the position information and the state information with an external device.

SUMMARY

The position information and the state information of the vehicle may be shared with various external devices to diversify the service. When information is shared with a plurality of external devices, a technology for efficiently sharing the information is necessary. For example, there is a need to change the sharing method depending on the type of an external device. In addition, because the position information and the state information of the vehicle correspond to personal information, security issues may occur when the position information and the state information are shared. For example, there is a need to change the range of information to be shared, depending on the type of an external device.

The present disclosure has been made to solve the above-mentioned problems occurring in the prior art while advantages achieved by the prior art are maintained intact.

An aspect of the present disclosure provides an apparatus, a server and a system that may provide an efficient and secure method for sharing position information and state information of a vehicle.

The technical problems to be solved by the present inventive concept are not limited to the aforementioned problems, and any other technical problems not mentioned herein will be clearly understood from the following description by those skilled in the art to which the present disclosure pertains.

According to an exemplary embodiment of the present disclosure, a position information sharing apparatus of a vehicle may include a communication circuit communicating with a server and a processor electrically connected to the communication circuit. The processor may be configured to receive authentication information for sharing of position information of the vehicle from the server, using the communication circuit, to transmit the authentication information to an external device, using the communication circuit such that the external device which is a sharing target of the authentication information is capable of obtaining the position information from the server, and to obtain information within a preset range corresponding to the apparatus among the position information at a preset timing corresponding to the apparatus, from the server using the authentication information.

The processor may be configured to communicate with the server in a communication scheme corresponding to the apparatus, using the communication circuit.

The processor may be configured to obtain authentication from the server in an authentication scheme corresponding to the apparatus using the authentication information.

The external device may be selected depending on a type of a service to be provided using the position information.

The external device may be selected based on an input of a user of the apparatus.

The processor may be configured to obtain the position information through a web page provided from the server.

The processor may be configured to obtain the position information by HTTP response corresponding to HTTP request provided from the server.

The processor may be configured to obtain the position information by a notification provided from the server.

The processor may be configured to periodically obtain the position information, using the authentication information.

The processor may be configured to check at least one of entrance or exit of the vehicle for a specified position, using the position information.

The processor may be configured to check at least one of departure, approach, or arrival of the vehicle for a specified position, using the position information.

The authentication information may be configured to enable the external device to obtain the position information through authentication by the server.

The position information may include information about at least one of a position, a start point, destination, expected arrival time, or route of the vehicle.

According to another exemplary embodiment of the present disclosure, a computer-readable recording medium may have recorded thereon instructions executed by at least one processor included in an apparatus. The instructions, when executed by the at least one processor, may cause the at least one processor to receive authentication information for sharing of position information of a vehicle from a server, to transmit the authentication information to an external device such that the external device which is a sharing target of the authentication information is capable of obtaining the position information from the server, and to obtain information within a preset range corresponding to the apparatus among the position information at a preset timing corresponding to the apparatus, from the server using the authentication information.

According to still another exemplary embodiment of the present disclosure, a server for sharing position information of a vehicle may include a communication circuit communicating with the vehicle and a processor electrically connected to the communication circuit. The processor may be configured to obtain position information of the vehicle and identification information of an external device, which is a sharing target of the position information, from the vehicle using the communication circuit, to transmit authentication information for sharing of the position information to the external device based on the identification information, using the communication circuit, to authenticate the external device or another device, which receives the authentication information from the external device, using the authentication information, and to transmit information within a preset range corresponding to the authenticated device among the position information, to the authenticated device at a preset timing corresponding to the authenticated device.

The timing and the range may be determined by the vehicle or may be determined by the processor based on a type of the authenticated device.

According to an embodiment, the processor may be configured to communicate with the authenticated device in a communication scheme corresponding to the authenticated device, using the communication circuit.

The processor may be configured to authenticate the external device or the another device in an authentication scheme corresponding to the authenticated device, using the authentication information.

The external device may include at least part of a user terminal, an IoT apparatus, a payment system, a position system, an emergency rescue system, an insurance company system, or an external vehicle.

The processor may be configured to obtain at least one of personal information, personal identification information, vehicle state information, vehicle guide information, or security information together with the position information, from the vehicle and to transmit the obtained information together with the position information to the authenticated device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
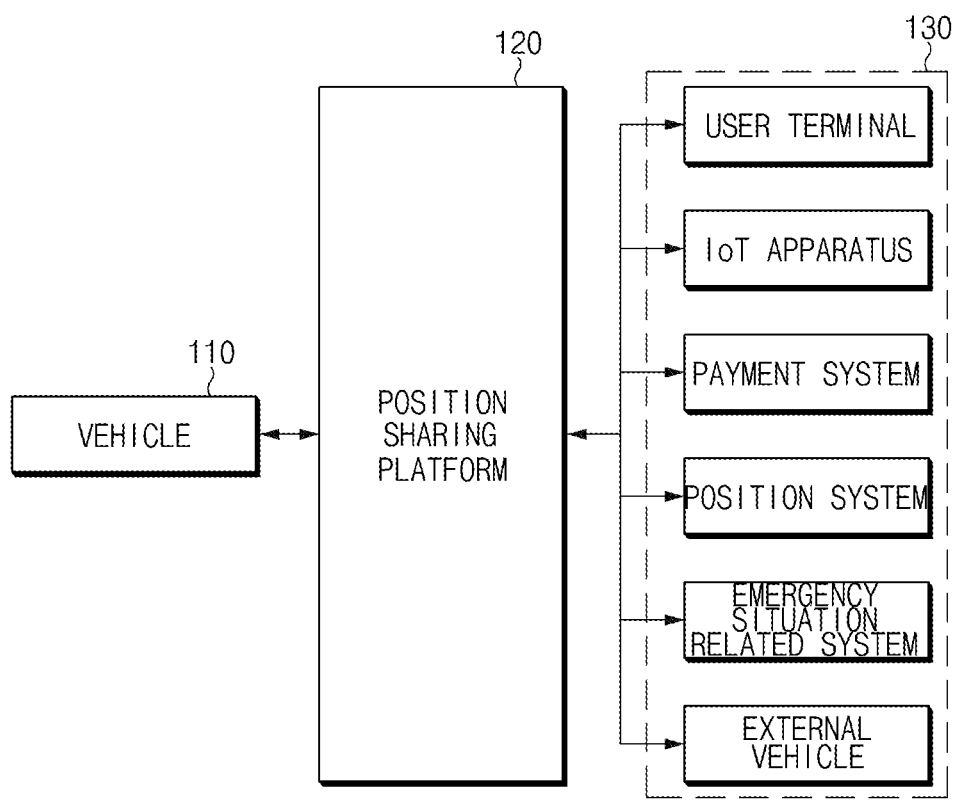
FIG. 1 is a block diagram illustrating an operating environment of a position information sharing system of a vehicle, according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which this disclosure belongs. It will be understood that terms used herein should be interpreted as having a meaning that is consistent with their meaning in the context of the present disclosure and the relevant art and will not be interpreted in an idealized or overly formal sense unless expressly so defined herein.

FIG. 1 is a block diagram illustrating an operating environment of a position information sharing system of a vehicle, according to an exemplary embodiment of the present disclosure.

Referring to FIG. 1, the position information sharing system according to an exemplary embodiment may include a vehicle 110, a position sharing platform 120, and a sharing target apparatus 130.

The vehicle 110 may collect position information and state information of the vehicle 110 and may transmit the collected information to the position sharing platform 120. The position sharing platform 120 may receive position information and state information of the vehicle 110 and may manage and process the position information sharing service. The sharing target apparatus 130 may provide a user with the service, using the shared position information.

For example, a user terminal may receive position information and state information using a web browser or a dedicated application, may provide the received information to the user, and may share the position information and the state information with other apparatuses. The IoT device (e.g., a speech recognition speaker, an air conditioner, a light bulb, TV, CCTV, a wall pad, a boiler, or the like) may perform various operations based on the position information and/or the state information, when the vehicle 110 enters the parking lot. The payment system (e.g., a parking lot payment system, ETCS, a drive through payment system, or the like) may perform payment and task processes, using the position information. The position system (e.g., a route search server or the like) may provide services such as route search, traffic information provision, and the like, using the position information. An emergency system (e.g., an insurance company system, an emergency rescue system) may query the position information and state information of the vehicle 110, when a car accident or theft occurs. An external vehicle may share position information with the vehicle 110 in opposite directions, and may use the position information for fleet driving.

In addition, various services such as inquiry of the state of public transportation, notification of carpool vehicle, car sharing, inquiry of the position of an emergency vehicle, inquiry of the position of a battery charging vehicle, notification of dangerous area entry, notification of safety zone exit, and the like may be provided through the sharing of position information.

Figure 2:
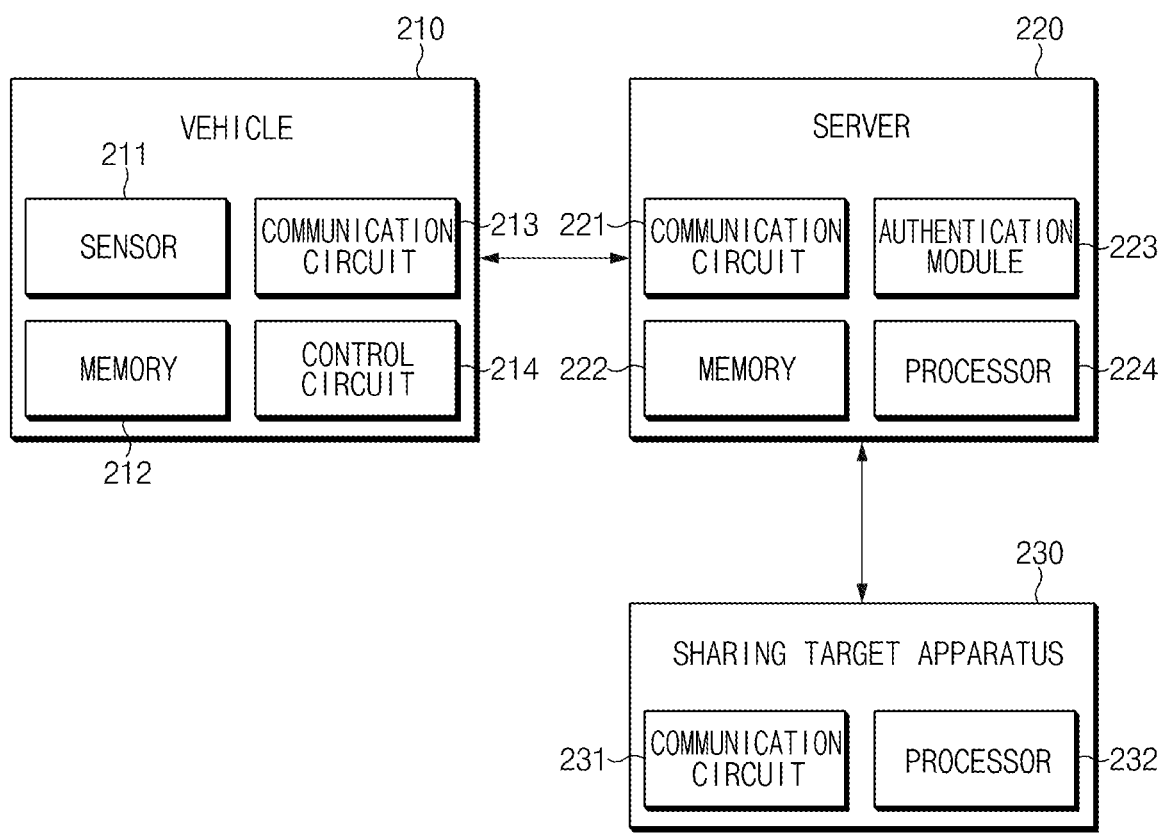
FIG. 2 is a block diagram illustrating a configuration of a vehicle, a server, and a sharing target apparatus, according to an exemplary embodiment of the present disclosure.

FIG. 2 is a block diagram illustrating a configuration of a vehicle, a server, and a sharing target apparatus, according to an exemplary embodiment of the present disclosure.

Referring to FIG. 2, a vehicle 210 according to an exemplary embodiment may include a sensor 211, a memory 212, a communication circuit 213, and a control circuit 214.

The sensor 211 may obtain information about the position, speed, acceleration, angular velocity, altitude, door lock/unlock, door open/close, trunk open/close, hood open/close, ignition on/off, battery charge state, tire air pressure, shift gear, or the like.

The memory 212 may store map information, occupant information, vehicle/AVN unique information, and the like.

The communication circuit 213 may transmit the position information and the state information of the vehicle 210 to a position sharing platform. For example, the position information may include current position information (coordinates, an address, road information, the vehicle direction, speed, current time, or the like) and destination information (a name, coordinates, an address, remaining time, a remaining distance, or the like). The state information of the vehicle 210 may include information about air conditioning (air conditioning on/off, air conditioning setting specification, temperature, fan speed, operating mode, defrost, or the like), engine (none/on/off), transmission (type, gear lever position, or the like), door (door lock/unlock, door open/close, trunk open/close, hood open/close, window open/close, sunroof open/close, or the like), heat wire (steering wheel, rear glass, sheet, or the like), the electric power state of electric car, a battery (battery charging state, charging level, charging time, travelable distance, or the like), fuel (residual fuel amount, travelable distance, or the like), or the like.

The control circuit 214 may be electrically connected to the sensor 211, the memory 212, and the communication circuit 213. The control circuit 214 may control the sensor 211, the memory 212, and the communication circuit 213 and may perform various data processing and calculation. For example, the control circuit 214 may be an electronic control unit (ECU) or a sub-controller, which is mounted in the vehicle 210.

The vehicle 210 may share position information with a server 220, even though a driver does not perform a separate operation. For example, the vehicle 210 may monitor the vehicle state and may transmit the changed information to the server 220 when the vehicle state is changed. For another example, the vehicle 210 may activate position sharing, when the vehicle 210 is turned on; the vehicle 210 may transmit position information to the server 220 in a short period, when the vehicle 210 is driving; the vehicle 210 may transmit position information to the server 220 in a long period, when the vehicle 210 is not driving. For another example, the vehicle 210 may transmit position information to the server 220, when the state (search, route search, route cancellation, destination arrival, or the like) of navigation is changed.

The server 220 according to an embodiment may include a communication circuit 221, a memory 222, an authentication module 223, and a processor 224. The server 220 may include a position sharing platform.

The communication circuit 221 may receive position information, state information, recipient information, and/or sharing condition information transmitted by the vehicle 210, and may transmit information for position sharing to a sharing target apparatus 230.

The memory 222 may include a database that stores position information and state information for each vehicle.

The authentication module 223 may perform the authentication procedure together with the vehicle 210 and may perform the authentication procedure together with the sharing target apparatus 230. The authentication module 223 may be integrated with a separate configuration or another configuration.

The processor 224 may be electrically connected to the communication circuit 221, the memory 222, and the authentication module 223. The processor 224 may control the communication circuit 221, the memory 222, and the authentication module 223 and may perform various data processing and calculation.

According to an embodiment, the processor 224 may obtain identification information of the sharing target apparatus 230, which is the sharing target of the position information and the position information of the vehicle 210, from the vehicle 210 using the communication circuit 221.

According to an exemplary embodiment, the processor 224 may transmit authentication information for sharing position information to the sharing target apparatus 230 using the communication circuit 221. The authentication information may be information required to authenticate secure communication between the server 220 and the sharing target apparatus 230. For example, the authentication information may include terminal specific information of the vehicle 210 (e.g., VIN, ICCID, USIM number, IMEI, terminal modem serial number, or the like), ID, a password, a randomly generated security code, or the like. For another example, authentication information may include a temporary code with valid time and inquiry authority.

According to an embodiment, the processor 224 may authenticate the sharing target apparatus 230 or another apparatus that receives the authentication information from the sharing target apparatus 230, using the authentication information and may transmit the position information to the authenticated apparatus. For example, the sharing target apparatus 230 may include at least part of a user terminal, an IoT device, a payment system, a position system, an emergency rescue system, an insurance company system, or an external vehicle. According to an exemplary embodiment, the processor 224 may obtain, from the vehicle 210, at least part of the personal information, personal identification information, vehicle state information, vehicle guide information, or security information together with position information and may transmit, to the authenticated apparatus, at least part of the obtained pieces of information together with the position information.

According to an exemplary embodiment, the processor 224 may transmit, to the authenticated sharing target apparatus 230, information within the preset range corresponding to the sharing target apparatus 230 in the position information at the preset timing corresponding to the sharing target apparatus 230. The timing and range requiring the position information may be different depending on the sharing target apparatus 230. Because the position information corresponds to private information, the position information does not need to be unnecessarily shared with the outside. Accordingly, the processor 224 may share position information within the required range at the timing at which the sharing target apparatus 230 needs the position information. The timing and range corresponding to the sharing target apparatus 230 may be determined by the vehicle 210 or by the user of the vehicle 210 or may be determined by the server 220 (e.g., the processor 224) based on the type of the sharing target apparatus 230. For example, the timing and range corresponding to the sharing target apparatus 230 may be determined depending on the security level of the sharing target apparatus 230 determined by the vehicle 210.

According to an embodiment, the processor 224 may use the communication method and authentication method corresponding to the sharing target apparatus 230. For example, the processor 224 may communicate with the sharing target apparatus 230 in the communication scheme corresponding to the sharing target apparatus 230 using the communication circuit 221 and may authenticate the sharing target apparatus 230 in the authentication scheme corresponding to the sharing target apparatus 230, using authentication information. The communication scheme and authentication scheme corresponding to the sharing target apparatus 230 may be determined by the user or may be determined depending on the type of the sharing target apparatus 230.

The vehicle 210 and the server 220 may perform the following authentication procedure for security. The server 220 may receive production information at a point in time when the vehicle 210 (or AVN of the vehicle 210) is produced, or may operate in conjunction with a system onto which production information is loaded. When the mobile communication network of the vehicle 210 is opened, the server 220 may transmit an authentication number to the vehicle 210. The vehicle 210 may encrypt the authentication number using the internal information of the vehicle 210 such as VIN, ICCID, and IMEI as a key and may transmit the encrypted authentication number to the server 220. The server 220 may decrypt the encrypted authentication number using the internal information of the vehicle 210, and may check the authentication number. When the authentication number is checked, the server 220 may issue an encryption key to the vehicle 210 for secure communication. The vehicle 210 may sign an ACK message using an encryption key to transmit the ACK message to the server 220, and the server 220 may check the signature. For the purpose of activating position sharing, the vehicle 210 may transmit a position sharing activation signal to the server 220 by using an encryption key. After checking the signature, the server 220 may issue a temporary key for transmitting position information, using the encryption key. The vehicle 210 may encrypt position information, state information, and identification information of the recipient, using a temporary key and may transmit the encrypted information to the server 220. The vehicle may set the security level of the recipient (the sharing target apparatus 230) in response to a user input and may transmit information about the set security level to the server 220.

The sharing target apparatus 230 may include a communication circuit 231 and a processor 232. The sharing target apparatus 230 may be an apparatus corresponding to the recipient identification information transmitted from the vehicle 210 to the server 220.

The communication circuit 231 may be configured to communicate with the server 220.

The processor 232 may be electrically connected to the communication circuit 231, may control the communication circuit 231 and other components, and may perform various data processing and calculation.

According to an exemplary embodiment, the processor 232 may receive authentication information for sharing the position information of the vehicle 210, from the server 220 using the communication circuit 231. For example, the position information may include information about at least part of the position, start point, destination, expected arrival time, and route of the vehicle 210.

According to an embodiment, the processor 232 may transmit authentication information to an external device using the communication circuit 231 such that another external device, which is the sharing target of the authentication information, is capable of obtaining the position information from the server 220. The authentication information may be configured to obtain the position information through authentication by the server 220 in an external device.

The external device may be selected depending on the type of service to be provided using the position information. For example, the service may include a real-time sharing service, a real-time inquiry service, a real-time notification service, and the like. The real-time sharing service may be a service that checks the state, position, destination, route, and parking position of the vehicle 210 during a specified sharing time in real time. The real-time sharing service may update the position of the vehicle 210 on a map in real time, and may transmit a message. The destination, the driving route, the expected arrival time, and the like may be provided depending on a sharer's selection. A notification at 10 minutes before arrival, a notification of arrival, and the like may be provided depending on a recipient's selection. The real-time inquiry service may check the position coordinates or address of the vehicle 210 in the request/response scheme on a one-off basis. The real-time notification service may automatically provide a notification including information such as the position and destination the vehicle 210 at a point in time when the vehicle 210 comes in or goes out at a specific point, within a specific area, or within a specific radius.

According to an exemplary embodiment, an external device may be selected based on the input of the user of the apparatus. The input of the user may be made at the vehicle 210 or at the sharing target apparatus 230.

According to an exemplary embodiment, the processor 232 may obtain position information from the server 220, using authentication information. The processor 232 may periodically obtain position information, using the authentication information. For example, when the sharing target apparatus 230 is a smart phone, a PC, a tablet, or the like, the processor 232 may obtain position information through a web page provided from the server 220 (real-time position sharing service). For another example, when the sharing target apparatus 230 is an external vehicle, an IoT device, or an emergency situation related system, the processor 232 may obtain position information by HTTP response to the HTTP request provided from the server 220 (real-time position inquiry service). For another example, when the sharing target apparatus 230 is a payment system, the processor 232 may obtain position information by a notification provided from the server 220 (real-time position notification service). The processor 232 may determine that the vehicle 210 goes in and/or out at a specified position, using the position information or may check at least part of the departure, approach, or arrival of the vehicle 210 at a specified position.

According to an embodiment, the processor 232 may obtain information within a preset range corresponding to the sharing target apparatus 230 in the position information at the preset timing corresponding to the sharing target apparatus 230, from the server 220 by using authentication information. The timing and range requiring the position information may be different depending on the sharing target apparatus 230. Because the position information corresponds to private information, the position information does not need to be unnecessarily shared with the outside. Accordingly, the processor 232 may obtain position information within the required range at a point in time when the sharing target apparatus 230 needs the position information. The timing and range corresponding to the sharing target apparatus 230 may be determined by the vehicle 210 or by the user of the vehicle 210 or may be determined by the server 220 (e.g., the processor 224) based on the type of the sharing target apparatus 230. For example, the timing and range corresponding to the sharing target apparatus 230 may be determined depending on the security level of the sharing target apparatus 230 determined by the vehicle 210.

According to an exemplary embodiment, the processor 232 may use the communication method and authentication method corresponding to the sharing target apparatus 230. For example, the processor 232 may communicate with the server 220 in the communication scheme corresponding to the sharing target apparatus 230 using the communication circuit 231 and may obtain authentication from the server 220 in the authentication scheme corresponding to the sharing target apparatus 230, using authentication information. The communication scheme and authentication scheme corresponding to the sharing target apparatus 230 may be determined by the user or may be determined depending on the type of the sharing target apparatus 230.

Table 1 includes descriptions of information shared in a position information sharing system according to an exemplary embodiment of the present disclosure.

TABLE 1

| Classification | Attribute | Example of data |
| --- | --- | --- |
| Personal information | Information owned by an individual | Name, address, vehicle type, payment information, contacts, recent destination, favorite, or the like |
| Personal position information | Personal position information | Time, vehicle position, start point, destination, expected arrival time, route, or the like |
| Personal identification information | Information for identifying an individual | Resident registration number, name, email, phone number, ID, credit card number, or the like |
| Vehicle state information | Information of a vehicle unrelated to an individual | Air conditioner/engine/ transmission/door/fuel amount/ state of charge, or the like |
| Vehicle safety information | Information linked to driver/vehicle safety | Airbag release information, theft detection signal, vehicle failure information, rollover sensor information, or the like |
| Security information | Authentication information for identifying an individual | Login password, Access Token, OTP code, VIN/NADID, security authentication key, or the like |

Table 2 includes descriptions of the authentication method used in the position information sharing system according to an exemplary embodiment of the present disclosure.

TABLE 2

| Purpose | Security authentication method | Example of data |
| --- | --- | --- |
| First authentication (Vehicle) | Encrypting vehicle unique information such as VIN/ICCID/IMEI, or the like based on a symmetric key SMS authentication scheme RSA public key/ private key scheme | Transmitting an authentication number (random number) from a server to a vehicle via SMS Connection HTTPS from the vehicle to the server Attaching VIN/ICCID/IMEI to the received authentication number to transmit a hash value Issuing an encryption key for authentication from the server to the vehicle Completing the exchange of a security communication key by |

TABLE 2-continued

| Purpose | Security authentication method | Example of data |
| --- | --- | --- |
| Activating position sharing (Vehicle) | RSA-based signature HTTPS security communication Block encryption of sensitive information | both parties Signing "information sharing start" information from the server to the vehicle at the time of position sharing activation Encrypting HTTPS communication upon transmitting real-time position from the server to the vehicle Encrypting block upon transmitting personal information/recipient identification information between the vehicle and the server |
| First authentication (Recipient) | OAuth standard-based authentication Authenticating contract and IP/public certificate | Using OAuth-based standard authentication, when a recipient is a system (a payment system, an IoT server, a smart home server, or the like) in the case of authenticating between the recipient and the server. authentication based on agreement with the corporation that owns the system and IP/public certificate |
| Position sharing usage (Recipient) | SMS authentication scheme Symmetric key exchange | Forwarding a symmetric key through an SMS authentication scheme (including URL for accessing SMS) when the recipient is an individual Forwarding a symmetric key through a pre-authenticated communication line when the recipient is a corporation/system |

The communication between the server 220 and the sharing target apparatus 230 may be based on pre-authentication. When the sharing target apparatus 230 is an external vehicle, the authentication procedure may be performed in the same scheme as the authentication scheme between the vehicle 210 and the server 220. When the sharing target apparatus 230 is a server system, the authentication procedure may be performed depending on the TLS standard of the public certificate. When the sharing target apparatus 230 is an IoT device, the authentication procedure may be performed depending on the server system controlling the IoT device and the TLS standard of the public certificate. When the sharing target apparatus 230 is a mobile terminal, the server 220 may generate the URL by hashing (SHA-256) the information using the encryption key, and may provide the URL to the mobile terminal.

Table 3 includes descriptions of sharing information, sharing time, and recipients according to a service type, in the position information sharing system according to an embodiment of the present disclosure.

TABLE 3

| Service type | Level | Access information | sharing time | Recipient |
| --- | --- | --- | --- | --- |
| Sharing service | 0 | Vehicle position/state | Always | Terminal/app of a user |

TABLE 3-continued

| Service type | Level | Access information | sharing time | Recipient |
|---|---|---|---|---|
| Sharing service | 1 | vehicle position | sharing time | Terminals/apps of Others |
| Inquiry service | 2 | vehicle position | sharing time | Others, a corporation server |
| Notification service | 3 | vehicle position | Received time | A user, others, a corporation server |
| Other services | 4 | Whether a vehicle position is checked | Received time | Provider server |

Figure 3:
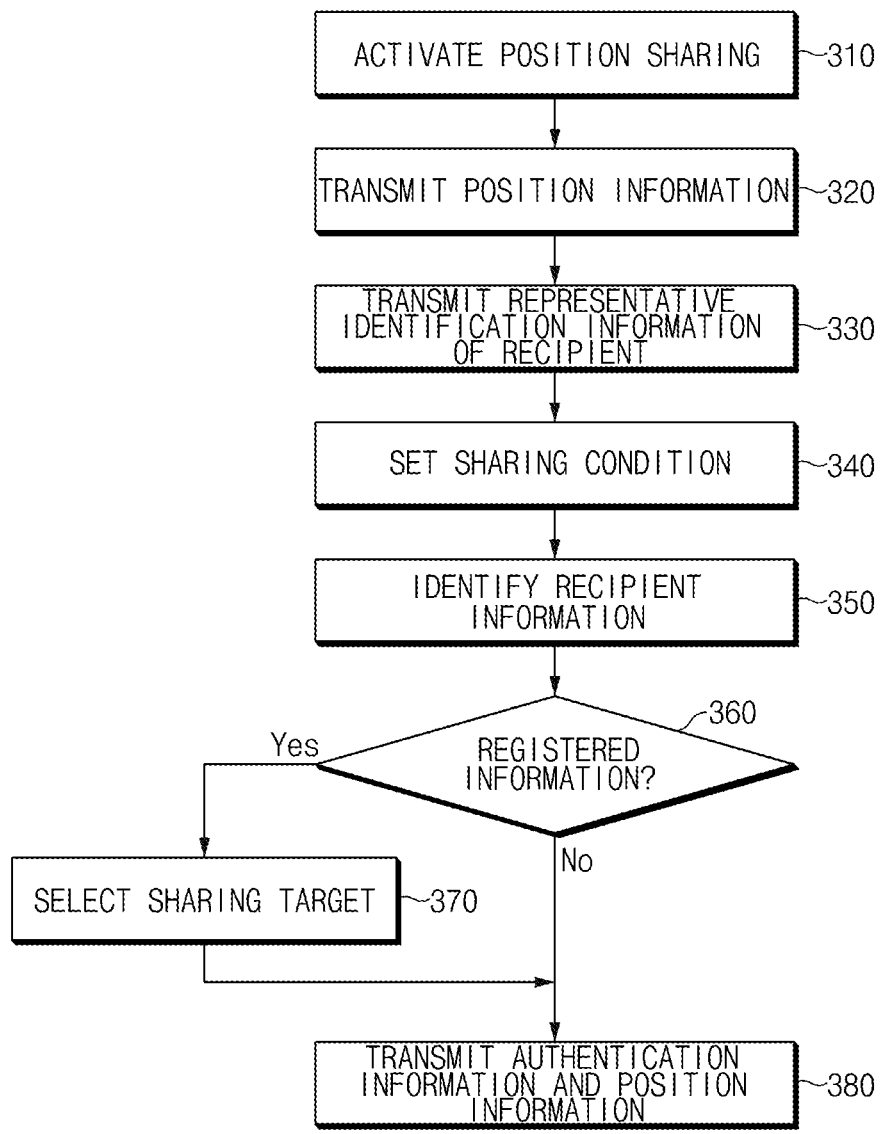
FIG. 3 is a flowchart for describing a position information sharing method of a vehicle, according to an exemplary embodiment of the present disclosure.

FIG. 3 is a flowchart for describing a position information sharing method of a vehicle, according to an exemplary embodiment of the present disclosure. Hereinafter, it is assumed that the vehicle 210 or the server 220 of FIG. 2 performs the process of FIG. 3.

Referring to FIG. 3, in operation 310, a vehicle may activate position sharing.

In operation 320, the vehicle may transmit position information to the server. The vehicle may periodically transmit position information and state information to the server when the position sharing is activated.

In operation 330, the vehicle may transmit the representative identification information of the recipient. The vehicle may transmit the representative identification information of the sharing target apparatus (e.g., a mobile phone number or the account ID corresponding to the mobile phone number) to the server.

In operation 340, the vehicle may set a sharing condition. The vehicle may set information (e.g., real-time position, destination, driving route, estimated time, authority and sharing service type, or the like) to be shared with the sharing target apparatus.

In operation 350, the server may identify recipient information.

In operation 360, the vehicle may determine whether the recipient information is the information registered in the server. The vehicle may determine whether the corresponding phone number or account information is the information registered in the server at a point in time when sharing is activated.

When the recipient information is the registered information, in operation 370, the vehicle may select a target to which the sharing is extended.

In operation 380, the server may transmit authentication information and position information to the recipient. The server may share position information with the selected object, when the target is selected by the vehicle; the server may share position information with the target determined depending on the sharing service type, when the recipient information is unregistered information.

Figure 4:
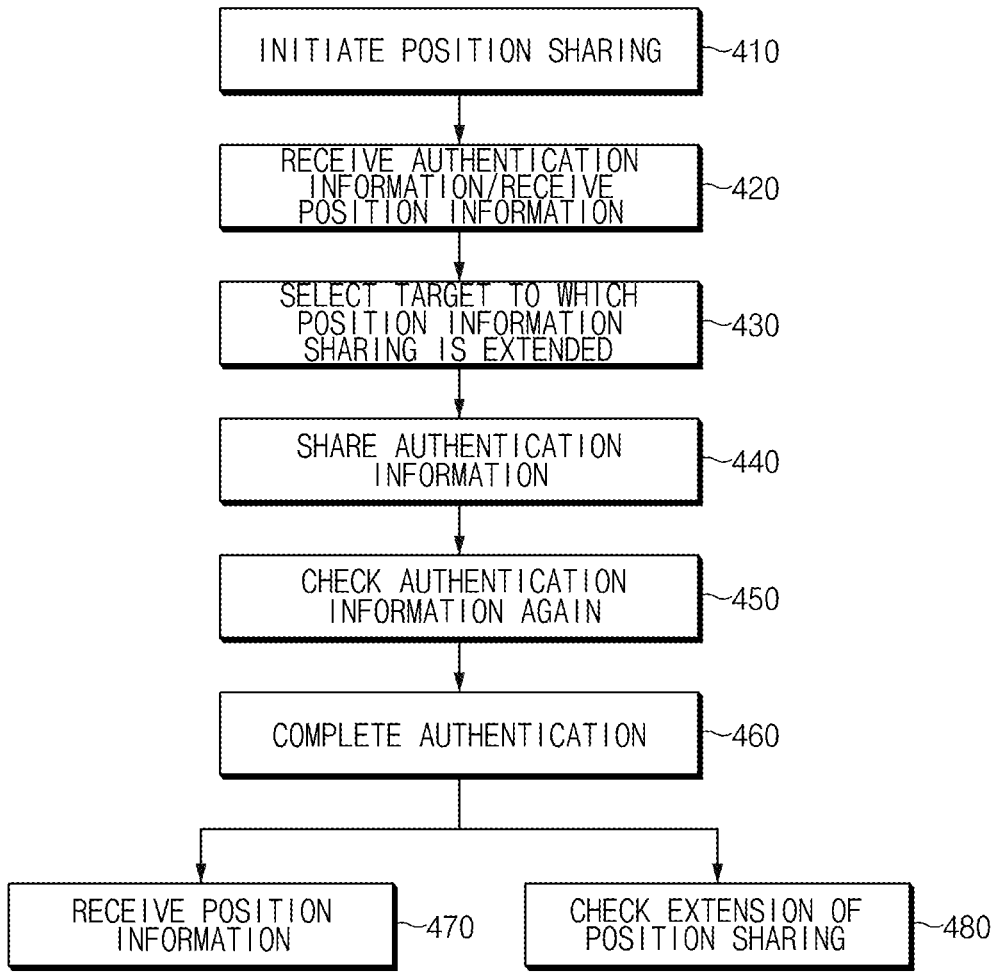
FIG. 4 is a flowchart for describing a position information sharing method of a vehicle, according to an exemplary embodiment of the present disclosure.

FIG. 4 is a flowchart for describing a position information sharing method of a vehicle, according to an exemplary embodiment of the present disclosure. Hereinafter, it is assumed that the server 220 or the sharing target apparatus 230 of FIG. 2 performs the process of FIG. 4.

Referring to FIG. 4, in operation 410, a server may initiate position sharing. The server may initiate position sharing with the sharing target apparatus, using the representative identification information of a recipient.

In operation 420, the sharing target apparatus may receive authentication information and position information from the server. The sharing target apparatus may receive authentication information from the server and may receive position information using authentication information.

In operation 430, the sharing target apparatus may select an extension target to which position information sharing is extended. The extension target may be selected by the vehicle or by the sharing target apparatus.

In operation 440, the sharing target apparatus may share authentication information with the extension target.

In operation 450, the server may check authentication information from the extension target again.

In operation 460, the server may complete the authentication through checking the authentication information again.

In operation 470, the extension target may receive position information from the server.

In operation 480, the sharing target apparatus may check the extension of the position sharing.

Figure 5:
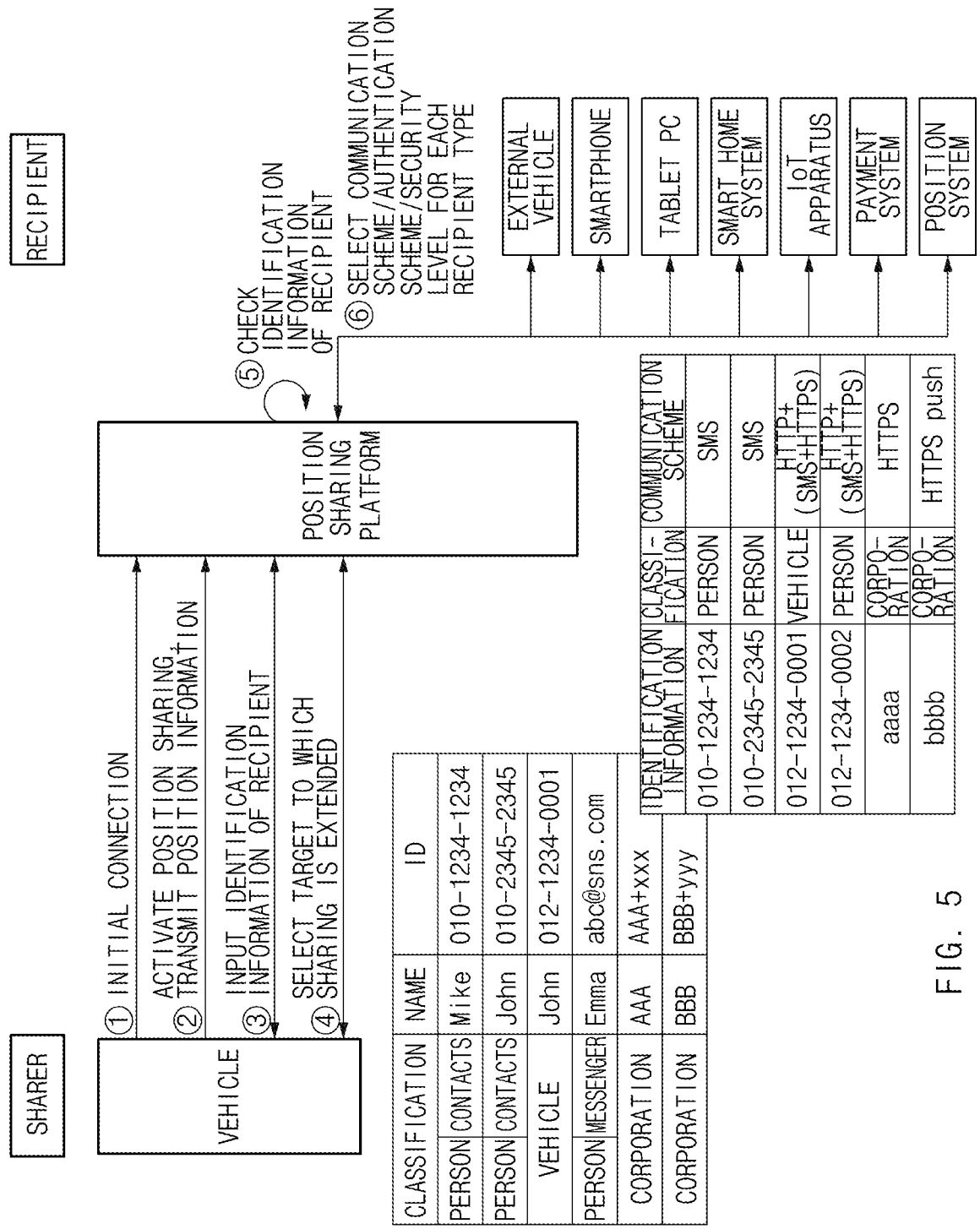
FIG. 5 is a view for describing an exemplary operation of a position information sharing system of a vehicle, according to an exemplary embodiment of the present disclosure.

FIG. 5 is a view for describing an exemplary operation of a position information sharing system of a vehicle, according to an exemplary embodiment of the present disclosure.

Referring to FIG. 5, a vehicle according to an embodiment may be connected to a position sharing platform. The vehicle may activate the sharing of position information. The vehicle may transmit position information to the position sharing platform. The vehicle may transmit identification information (e.g., identification information of a smartphone) of a recipient to the position sharing platform. The vehicle may select a target to which the sharing of position information is extended. For example, the vehicle may select a smart home system and an external vehicle as the extension target. The position sharing platform may check identification information of the recipient and may share position information with the recipient and the extension target. The position sharing platform may select a communication scheme, an authentication scheme, and a security level depending on the type of recipient. For example, the position sharing platform may determine the communication scheme, the authentication scheme, and the security level depending on the pre-stored identification information and classification system. The position sharing platform may perform communication and authentication on a smartphone, a smart home system, and an external vehicle, using the different communication schemes and authentication schemes. Furthermore, the position sharing platform may differently set the timing, at which position information is shared, and the range of information to be shared, to the smartphone, the smart home system, and the external vehicle.

Figure 6:
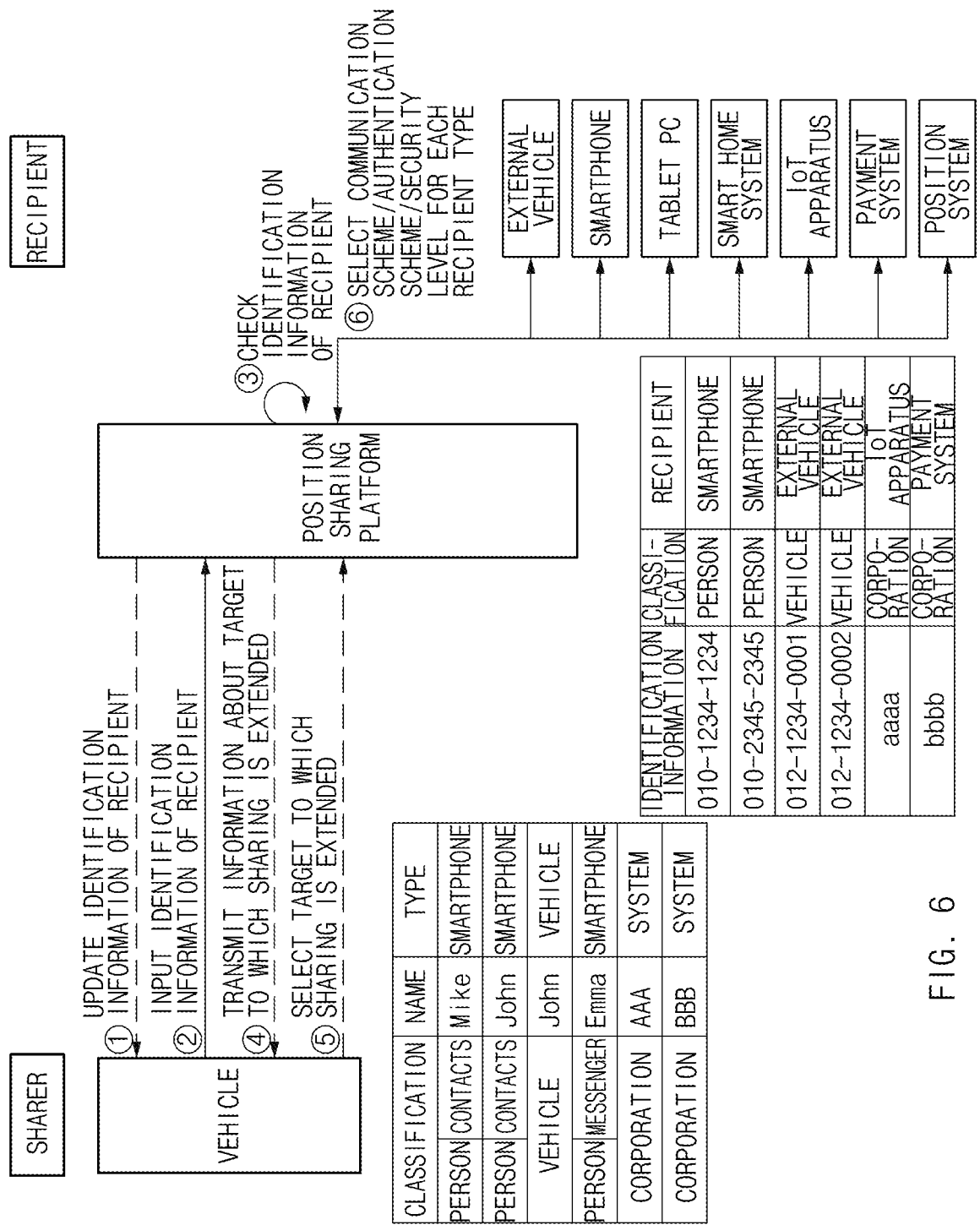
FIG. 6 is a view for describing an exemplary operation of a position information sharing system of a vehicle, according to an exemplary embodiment of the present disclosure.

FIG. 6 is a view for describing an exemplary operation of a position information sharing system of a vehicle, according to an exemplary embodiment of the present disclosure.

Referring to FIG. 6, a position sharing platform according to an exemplary embodiment may update the identification information of a recipient with a vehicle. For example, the position sharing platform may transmit information about the recipient, which is an authorized corporation, to the vehicle. The vehicle may transmit identification information of the recipient to the position sharing platform. The position sharing platform may transmit information about the target capable of extending the sharing of position information, to the vehicle. For example, the transmitted information may include type information of the recipient and identification information of the recipient. The vehicle may select the extension target, using the transmitted information. The position sharing platform may check identification information of the recipient and may share position information with the recipient and the extension target.

Figure 7:
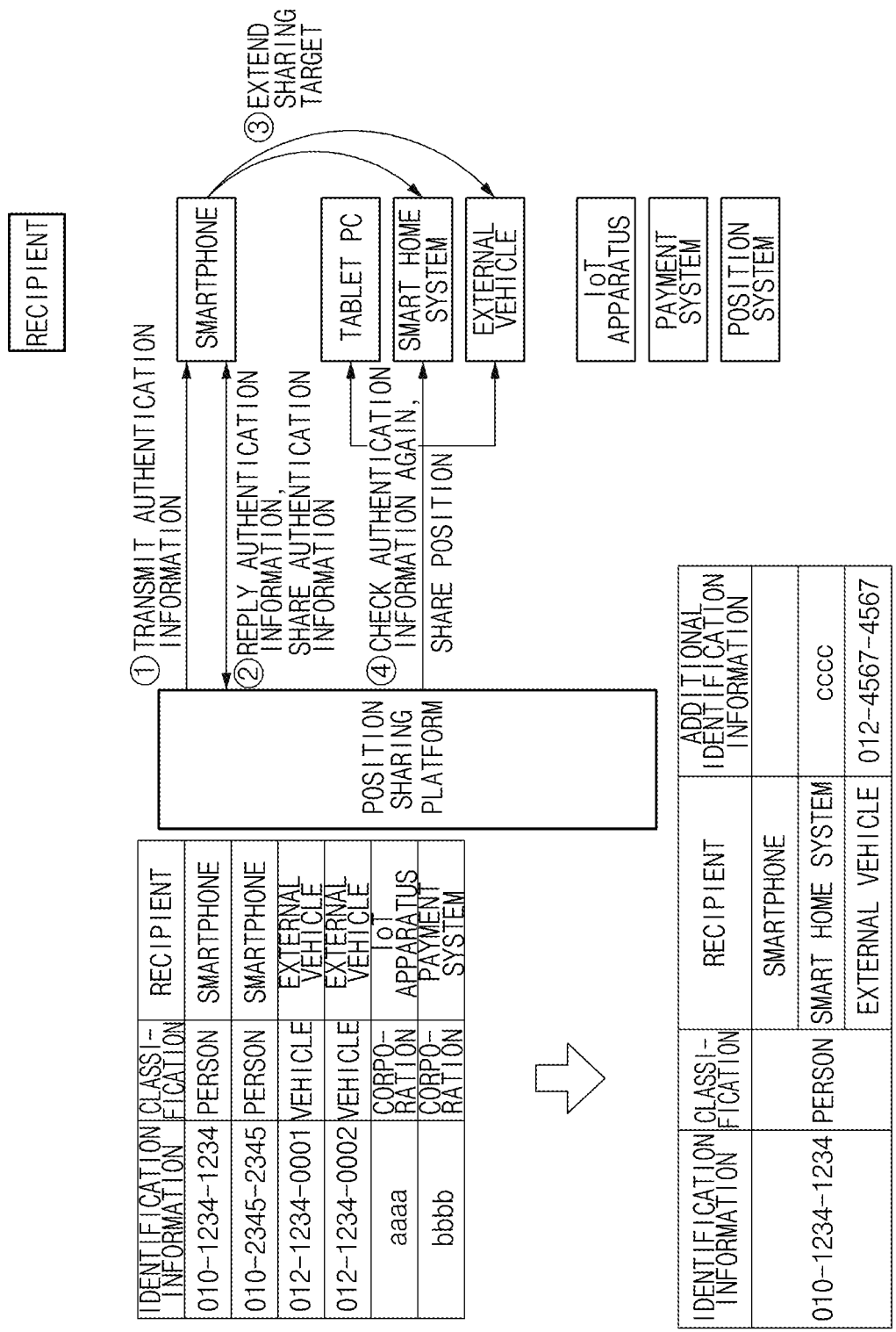
FIG. 7 is a view for describing an exemplary operation of a position information sharing system of a vehicle, according to an exemplary embodiment of the present disclosure.

FIG. 7 is a view for describing an exemplary operation of a position information sharing system of a vehicle, according to an embodiment of the present disclosure.

Referring to FIG. 7, a position sharing platform according to an embodiment may transmit authentication information to a smartphone, which is a recipient, and may share position information with the smartphone. For example, a sharing extension target may be a smart home system and an external vehicle. The sharing extension target may be selected by the recipient. The smartphone may share authentication information with the smart home system and the external vehicle, when the recipient extends the channel for sharing position information. The smart home system and the external vehicle may obtain authentication from a position sharing platform, using the received authentication information. The position sharing platform may add a smart home system and an external vehicle to the sharing extension target and may store identification information of the smart home system and the external vehicle. The position sharing platform may set a communication scheme and an authentication scheme to each of the recipient and the sharing extension target depending on the predefined rule and may set the sharing timing and sharing range to each of the recipient and the sharing extension target based on the security level of each of the recipient and the sharing extension target.

Figure 8:
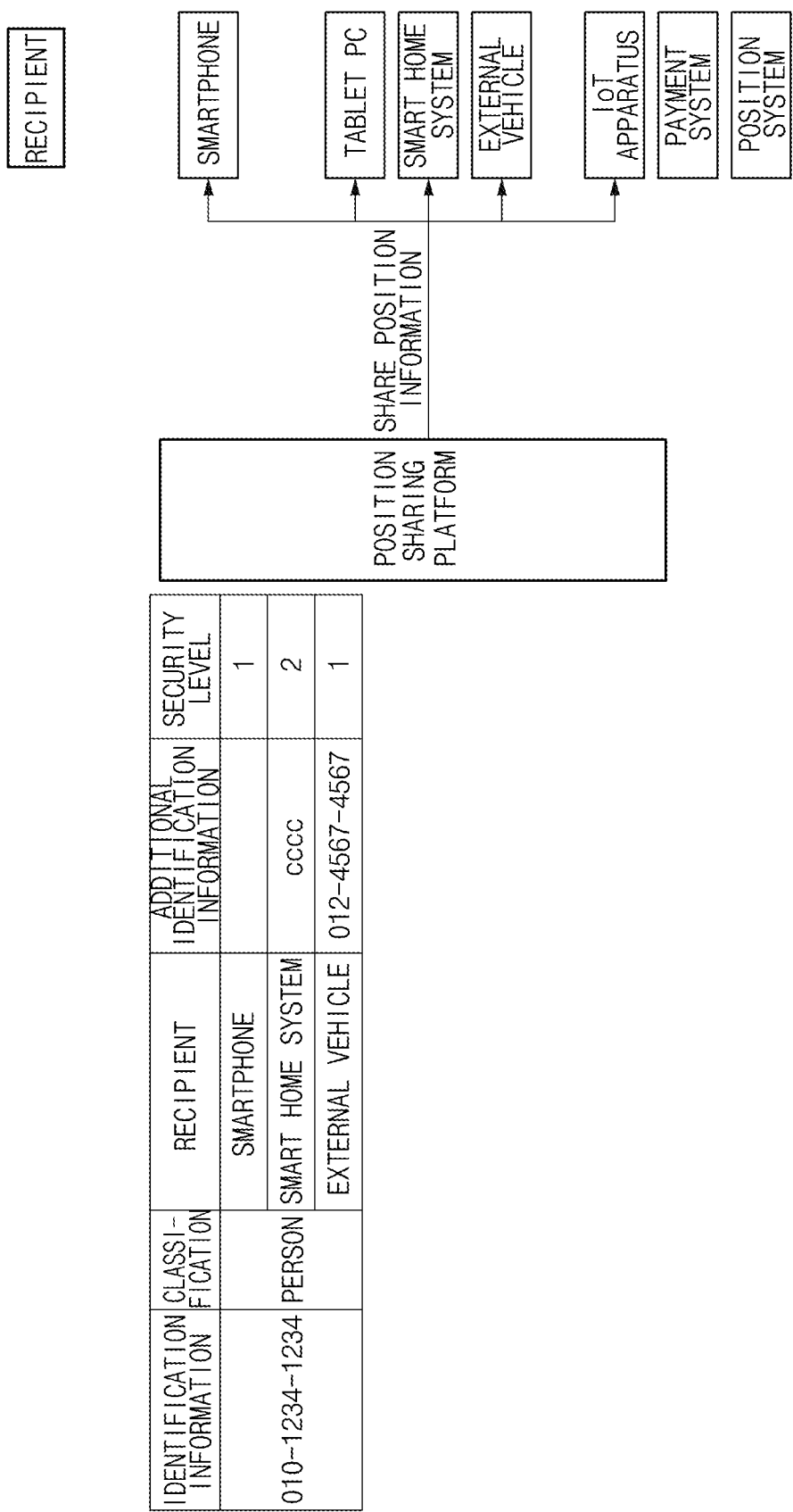
FIG. 8 is a view for describing an exemplary operation of a position information sharing system of a vehicle, according to an exemplary embodiment of the present disclosure.

FIG. 8 is a view for describing an exemplary operation of a position information sharing system of a vehicle, according to an exemplary embodiment of the present disclosure.

Referring to FIG. 8, a position sharing platform according to an embodiment may share position information to a plurality of recipients. For example, the position sharing platform may share position information with a smartphone, a smart home system, and an external vehicle. The position sharing platform may communicate with a smartphone, a smart home system, and an external vehicle using different communication schemes and may authenticate the smartphone, a smart home system, and an external vehicle, using different authentication schemes. The position sharing platform may determine the sharing timing and sharing range of position information, based on the security level of each of the smartphone, the smart home system, and the external vehicle. For example, the position sharing platform may always share the position information and the state information of the vehicle, with the smartphone and the external vehicle corresponding to security level 1. The smartphone and the external vehicle may check the position, route, or the like of the vehicle in real time. For another example, the position sharing platform may share the position information of the vehicle with the smart home system corresponding to security level 2 at a specified sharing time (e.g., when a vehicle enters a particular area). The smart home system may check entrance or exit information of the vehicle for the specified parking lot.

Figure 9:
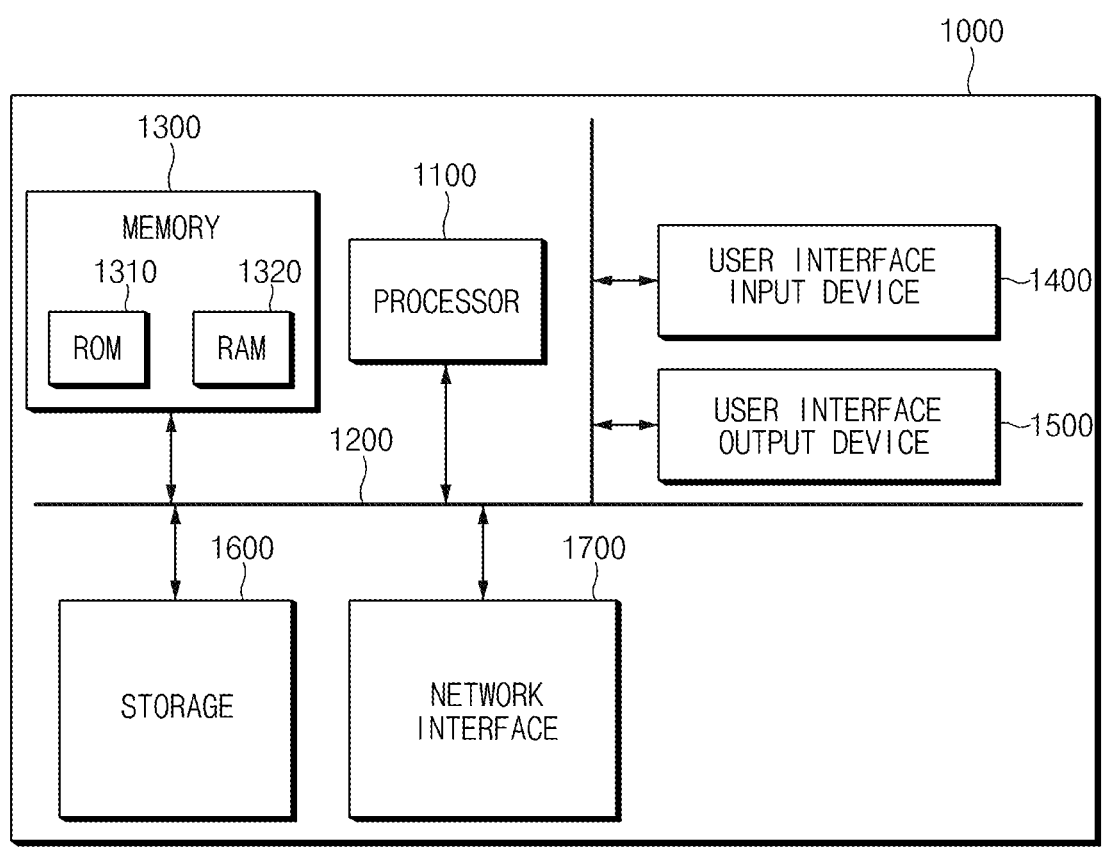
FIG. 9 illustrates a computing system according to an exemplary embodiment of the present disclosure.

FIG. 9 illustrates a computing system according to an embodiment of the present disclosure.

Referring to FIG. 9, an apparatus according to an embodiment of the present disclosure may be implemented through a computing system. A computing system 1000 may include at least one processor 1100, a memory 1300, a user interface input device 1400, a user interface output device 1500, storage 1600, and a network interface 1700, which are connected with each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may be implemented with separate components in the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, exemplary embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

According to an exemplary embodiment of the present disclosure, an apparatus and a server for sharing position information of a vehicle may re-evaluate efficiency and security of information sharing by changing the sharing timing and sharing range of information depending on a sharing target apparatus.

Besides, a variety of effects directly or indirectly understood through this disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A position information sharing apparatus of a vehicle, the apparatus comprising:
   a communication circuit configured to communicate with a server; and
   a processor electrically connected to the communication circuit,
   wherein the processor is configured to:
      receive authentication information for sharing of position information of the vehicle from the server, using the communication circuit, transmit the authentication information to an external device disposed outside of the vehicle, using the communication circuit such that the external device which is a sharing target of the authentication information obtains the position information of the vehicle from the server, and obtain information within a preset range corresponding to the apparatus among the position information at a preset timing corresponding to the apparatus from the server using the authentication information, wherein the authentication information is information required to authenticate secure communication between the server and the external device, and wherein the external device obtains authentication from the server using the authentication information.

2. The apparatus of claim 1, wherein the processor is configured to communicate with the server in a communication scheme corresponding to the apparatus, using the communication circuit.

3. The apparatus of claim 1, wherein the processor is configured to obtain authentication from the server in an authentication scheme corresponding to the apparatus using the authentication information.

4. The apparatus of claim 1, wherein the external device is selected depending on a type of a service to be provided using the position information.

5. The apparatus of claim 1, wherein the external device is selected based on an input of a user of the apparatus.

6. The apparatus of claim 1, wherein the processor is configured to obtain the position information through a web page provided from the server.

7. The apparatus of claim 1, wherein the processor is configured to obtain the position information by a Hypertext Transfer Protocol (HTTP) response corresponding to an HTTP request provided from the server.

8. The apparatus of claim 1, wherein the processor is configured to obtain the position information by a notification provided from the server.

9. The apparatus of claim 1, wherein the processor is configured to periodically obtain the position information, using the authentication information.

10. The apparatus of claim 1, wherein the processor is configured to check at least one of entrance or exit of the vehicle for a specified position, using the position information.

11. The apparatus of claim 1, wherein the processor is configured to check at least one of departure, approach, or arrival of the vehicle for a specified position, using the position information.

12. The apparatus of claim 1, wherein the authentication information is configured to enable the external device to obtain the position information through authentication by the server.

13. The apparatus of claim 1, wherein the position information includes information about at least one of a position, a start point, a destination, an expected arrival time, or a route of the vehicle.

14. A non-transitory computer-readable recording medium having recorded thereon instructions executed by at least one processor included in an apparatus, the instructions, when executed by the at least one processor, causing the at least one processor to:

receive authentication information for sharing of position information of a vehicle from a server;

transmit the authentication information to an external device disposed outside of the vehicle such that the external device which is a sharing target of the authentication information obtained the position information from the server; and obtain information within a preset range corresponding to the apparatus among the position information of the vehicle at a preset timing corresponding to the apparatus, from the server using the authentication information, wherein the authentication information is information required to authenticate secure communication between the server and the external device, and wherein the external device obtains authentication from the server using the authentication information.

15. A server for sharing position information of a vehicle, the server comprising:

a communication circuit configured to communicate with the vehicle; and a processor electrically connected to the communication circuit, wherein the processor is configured to:

obtain position information of the vehicle and identification information of an external device, which is disposed outside of the vehicle and is a sharing target of the position information, from the vehicle using the communication circuit, transmit authentication information for sharing of the position information of the vehicle to the external device based on the identification information, using the communication circuit, authenticate the external device or another device, which receives the authentication information from the external device, using the authentication information, and transmit information within a preset range corresponding to the authenticated device among the position information, to the authenticated device at a preset timing corresponding to the authenticated device, wherein the authentication information is information required to authenticate secure communication between the server and the external device, and wherein the external device obtains authentication from the server using the authentication information.

16. The server of claim 15, wherein the preset timing and the range are determined by the vehicle or determined by the processor based on a type of the authenticated device.

17. The server of claim 15, wherein the processor is configured to communicate with the authenticated device in a communication scheme corresponding to the authenticated device, using the communication circuit.

18. The server of claim 15, wherein the processor is configured to authenticate the external device or the another device in an authentication scheme corresponding to the authenticated device, using the authentication information.

19. The server of claim 15, wherein the external device includes at least one of a user terminal, an Internet of Things (TOT) apparatus, a payment system, a position system, an emergency rescue system, an insurance company system, or an external vehicle.

20. The server of claim 15, wherein the processor is configured to:

obtain at least one of personal information, personal identification information, vehicle state information, vehicle guide information, or security information together with the position information, from the vehicle, and transmit the obtained information together with the position information to the authenticated device.

\* \* \* \* \*